US012602611B2

(12) United States Patent
Gopalan

(10) Patent No.: US 12,602,611 B2
(45) Date of Patent: *Apr. 14, 2026

(54) DYNAMIC UPDATING OF MACHINE LEARNING MODELS

(71) Applicant: AT&T Intellectual Property I, L.P., Atlanta, GA (US)

(72) Inventor: Raghuraman Gopalan, Dublin, CA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 503 days.

This patent is subject to a terminal disclaimer.

(21) Appl. No.: 17/504,418

(22) Filed: Oct. 18, 2021

(65) Prior Publication Data

US 2022/0036242 A1 Feb. 3, 2022

Related U.S. Application Data

(63) Continuation of application No. 15/476,432, filed on Mar. 31, 2017, now Pat. No. 11,151,472.

(51) Int. Cl.
*G06N 20/00* (2019.01)
*G06N 7/01* (2023.01)

(52) U.S. Cl.
CPC .............. *G06N 20/00* (2019.01); *G06N 7/01* (2023.01)

(58) Field of Classification Search
CPC ...... G06N 3/088; G06N 3/096; G06N 3/0985; G06N 3/084; G06N 3/086; G06N 3/082;

G06N 3/0895; G06N 3/09; G06N 3/091; G06N 3/094; G06N 3/092; G06N 3/098; G06N 3/08; G06N 7/00; G06N 7/01; G06N 20/00
See application file for complete search history.

(56) References Cited

U.S. PATENT DOCUMENTS

| | | | | |
|---|---|---|---|---|
| 6,067,535 | A | * | 5/2000 | Hobson ................. H04W 12/12 706/16 |
| 6,772,149 | B1 | | 8/2004 | Morelock et al. |
| 8,249,344 | B2 | | 8/2012 | Viola |
| 9,323,839 | B2 | | 4/2016 | Shibata et al. |
| 9,589,277 | B2 | | 3/2017 | Zhang et al. |

(Continued)

FOREIGN PATENT DOCUMENTS

| | | |
|---|---|---|
| EP | 2839389 A1 | 2/2015 |
| JP | 06215184 A | 8/1994 |

(Continued)

OTHER PUBLICATIONS

Zhang at al., Outlier Detection Techniques for Wireless Sensor Networks: A Survey, 2010, IEEE Communications Surveys & Tutorials, vol. 12, No. 2, Second Quarter 2010 (Year: 2010).*

(Continued)

*Primary Examiner* — David Yi

(57) ABSTRACT

A method may include a processor training a machine learning model with a training data set, computing a data distribution of the training data set, processing a stream of new data to determine a likelihood of the new data from the data distribution that is computed, incrementing a counter when the likelihood of the new data is less than a first threshold, and retraining the machine learning model when the counter exceeds a second threshold.

20 Claims, 3 Drawing Sheets

100

(56) References Cited

U.S. PATENT DOCUMENTS

| | | | |
|---|---|---|---|
| 2008/0195650 A1* | 8/2008 | Lingenfelder | G06N 20/00 |
| | | | 707/999.102 |
| 2010/0104086 A1* | 4/2010 | Park | H04M 3/51 |
| | | | 379/265.09 |
| 2011/0184896 A1 | 7/2011 | Guyon | |
| 2012/0284213 A1* | 11/2012 | Lin | G06N 3/08 |
| | | | 714/E11.02 |
| 2014/0310072 A1 | 10/2014 | Wojciechowski | |
| 2014/0365314 A1 | 12/2014 | Torrens et al. | |
| 2015/0006297 A1 | 1/2015 | Stark | |
| 2015/0139074 A1 | 5/2015 | Bane et al. | |
| 2015/0199609 A1 | 7/2015 | Rao et al. | |
| 2015/0371147 A1 | 12/2015 | Wright | |
| 2016/0140440 A1 | 5/2016 | Hsueh et al. | |
| 2016/0189057 A1 | 6/2016 | Rao et al. | |
| 2016/0292590 A1 | 10/2016 | Kruglick | |
| 2016/0292769 A1 | 10/2016 | Colson et al. | |
| 2016/0358099 A1 | 12/2016 | Sturlaugson et al. | |
| 2017/0061329 A1 | 3/2017 | Kobayashi et al. | |

FOREIGN PATENT DOCUMENTS

| | | |
|---|---|---|
| JP | 2002133389 A | 5/2002 |
| RU | 2234126 C2 | 8/2004 |
| WO | 2017005341 A1 | 1/2017 |

OTHER PUBLICATIONS

Liu et al., Adaptive sampling for thresholding in document filtering and classification, 2004 (Year: 2004).*

Papadimitriou et al., LOCI: Fast Outlier Detection Using the Local Correlation Integral, 2003, Proceedings of the 19th International Conference on Data Engineering (ICDE'03), pp. 315-326 (Year: 2003).*

Khalid et al., A Survey of Feature Selection and Feature Extraction Techniques in Machine Learning, 2014, Science and Information Conference 2014, pp. 372-378 (Year: 2014).*

Yang Zhang et al., Outlier Detection Techniques for Wireless Sensor Networks: A Survey, Jun. 2010, IEEE Communications Surveys & Tutorials, vol. 12, No. 2, Second Quarter 2010 (Year: 2010).

Rey-Long Liu et al., Adaptive sampling for thresholding in document filtering and classification, May 2004, Information Processing and Management 41, pp. 745-758 (Year: 2004).

Spiros Papadimitriou, LOCI: Fast Outlier Detection Using the Local Correlation Integral, 2003, Proceedings of the 19th International Conference on Data Engineering (ICDE'03) (Year: 2003).

Yucheng Low et al., "Distributed Graph Lab: a framework for machine learning and data mining in the cloud." Proceedings of the VLDB Endowment 5.8 (Apr. 1, 2012): pp. 716-727. https://arxiv.org/pdf /1204.6078. pdf.

Robert A. Jacobs, "Increased Rates of Convergence Through Learning Rate Adaptation." Neural Networks 1 (1988): pp. 295-307. http://www.academia.edu/download/32005051/Jacobs.NN88.pdf.

Matthew D. Zeiler, "Adadel Ta: an adaptive learning rate method." arXiv preprint arXiv:1212.5701 (Dec. 22, 2012). 6 Pages. https://arxiv.org/pdf/1212.5701v1 .pdf.

Haibo He et al., "ADASYN: Adaptive synthetic sampling approach for imbalanced learning." Neural Networks, 2008. IJCNN 2008. (IEEE World Congress on Computational Intelligence). IEEE International Joint Conference on. IEEE, Jun. 1, 2008. pp. 1322-1328. http://citeseerx.ist.psu.edu/viewdoc/download?doi=10.1.1.309.942&rep=rep1 &type=pdf.

* cited by examiner

Figure 2:
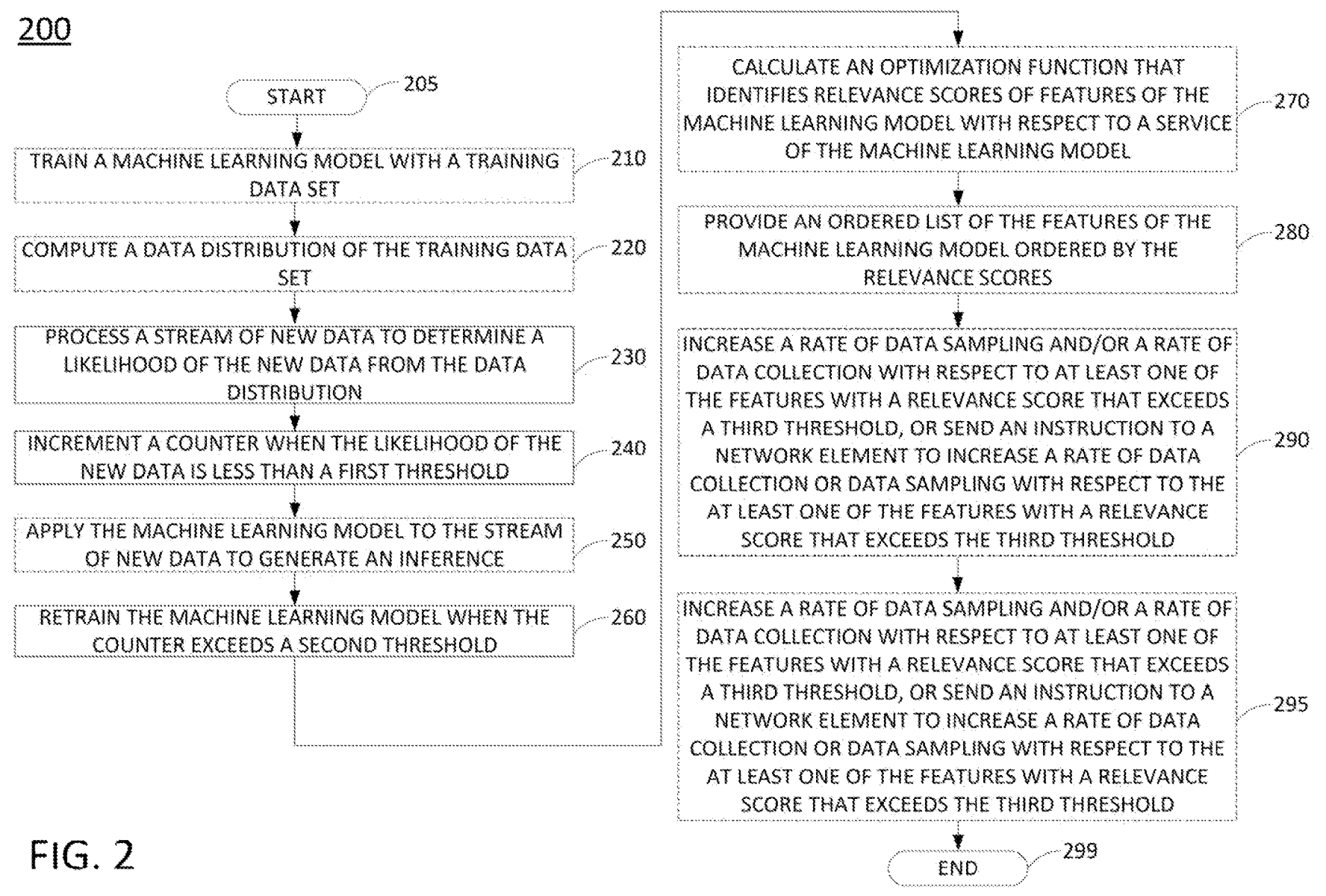

200

START ~205

TRAIN A MACHINE LEARNING MODEL WITH A TRAINING DATA SET ~210

COMPUTE A DATA DISTRIBUTION OF THE TRAINING DATA SET ~220

PROCESS A STREAM OF NEW DATA TO DETERMINE A LIKELIHOOD OF THE NEW DATA FROM THE DATA DISTRIBUTION ~230

INCREMENT A COUNTER WHEN THE LIKELIHOOD OF THE NEW DATA IS LESS THAN A FIRST THRESHOLD ~240

APPLY THE MACHINE LEARNING MODEL TO THE STREAM OF NEW DATA TO GENERATE AN INFERENCE ~250

RETRAIN THE MACHINE LEARNING MODEL WHEN THE COUNTER EXCEEDS A SECOND THRESHOLD ~260

CALCULATE AN OPTIMIZATION FUNCTION THAT IDENTIFIES RELEVANCE SCORES OF FEATURES OF THE MACHINE LEARNING MODEL WITH RESPECT TO A SERVICE OF THE MACHINE LEARNING MODEL ~270

PROVIDE AN ORDERED LIST OF THE FEATURES OF THE MACHINE LEARNING MODEL ORDERED BY THE RELEVANCE SCORES ~280

INCREASE A RATE OF DATA SAMPLING AND/OR A RATE OF DATA COLLECTION WITH RESPECT TO AT LEAST ONE OF THE FEATURES WITH A RELEVANCE SCORE THAT EXCEEDS A THIRD THRESHOLD, OR SEND AN INSTRUCTION TO A NETWORK ELEMENT TO INCREASE A RATE OF DATA COLLECTION OR DATA SAMPLING WITH RESPECT TO THE AT LEAST ONE OF THE FEATURES WITH A RELEVANCE SCORE THAT EXCEEDS THE THIRD THRESHOLD ~290

INCREASE A RATE OF DATA SAMPLING AND/OR A RATE OF DATA COLLECTION WITH RESPECT TO AT LEAST ONE OF THE FEATURES WITH A RELEVANCE SCORE THAT EXCEEDS A THIRD THRESHOLD, OR SEND AN INSTRUCTION TO A NETWORK ELEMENT TO INCREASE A RATE OF DATA COLLECTION OR DATA SAMPLING WITH RESPECT TO THE AT LEAST ONE OF THE FEATURES WITH A RELEVANCE SCORE THAT EXCEEDS THE THIRD THRESHOLD ~295

END ~299

DYNAMIC UPDATING OF MACHINE LEARNING MODELS

This application is a continuation of U.S. patent application Ser. No. 15/476,432, filed on Mar. 31, 2017, now U.S. Pat. No. 11,151,472, which is herein incorporated by reference in its entirety.

The present disclosure relates generally to intelligent automatic updating, or retraining of machine learning models, and more particularly to retraining a machine learning model when a counter for a likelihood of new data based upon a training data set being less than a first threshold exceeds a second threshold.

BACKGROUND

At the core of big data applications and services are machine learning models that analyze large volumes of data to deliver various insights, key performance indicators, and other actionable information to the users of the applications and services. Designers may differentiate machine learning models, or machine learning algorithms (MLAs) for different big data applications involving video, speech, text, location information, images, network traffic data, and so forth. For example, different machine learning models (derived from corresponding MLAs) may include support vector machine (SVMs), e.g., binary classifiers and/or linear binary classifiers, multi-class classifiers, kernel-based SVMs, or the like, a distance-based classifier, a decision tree algorithm/model, a k-nearest neighbor (KNN) algorithm/model, and so on.

SUMMARY

In one example, the present disclosure provides a device, computer-readable medium, and method for retraining a machine learning model when a counter for a likelihood of new data based upon a training data set being less than a first threshold exceeds a second threshold. For example, a processor may train a machine learning model with a training data set, compute a data distribution of the training data set, process a stream of new data to determine a likelihood of the new data from the data distribution that is computed, increment a counter when the likelihood of the new data is less than a first threshold, and retrain the machine learning model when the counter exceeds a second threshold.

BRIEF DESCRIPTION OF THE DRAWINGS

The present disclosure can be readily understood by considering the following detailed description in conjunction with the accompanying drawings, in which:

FIG. 2 illustrates an example flowchart of a method for retraining a machine learning model when a counter for a likelihood of new data based upon a training data set being less than a first threshold exceeds a second threshold.

To facilitate understanding, identical reference numerals have been used, where possible, to designate identical elements that are common to the figures.

DETAILED DESCRIPTION

Figure 1:
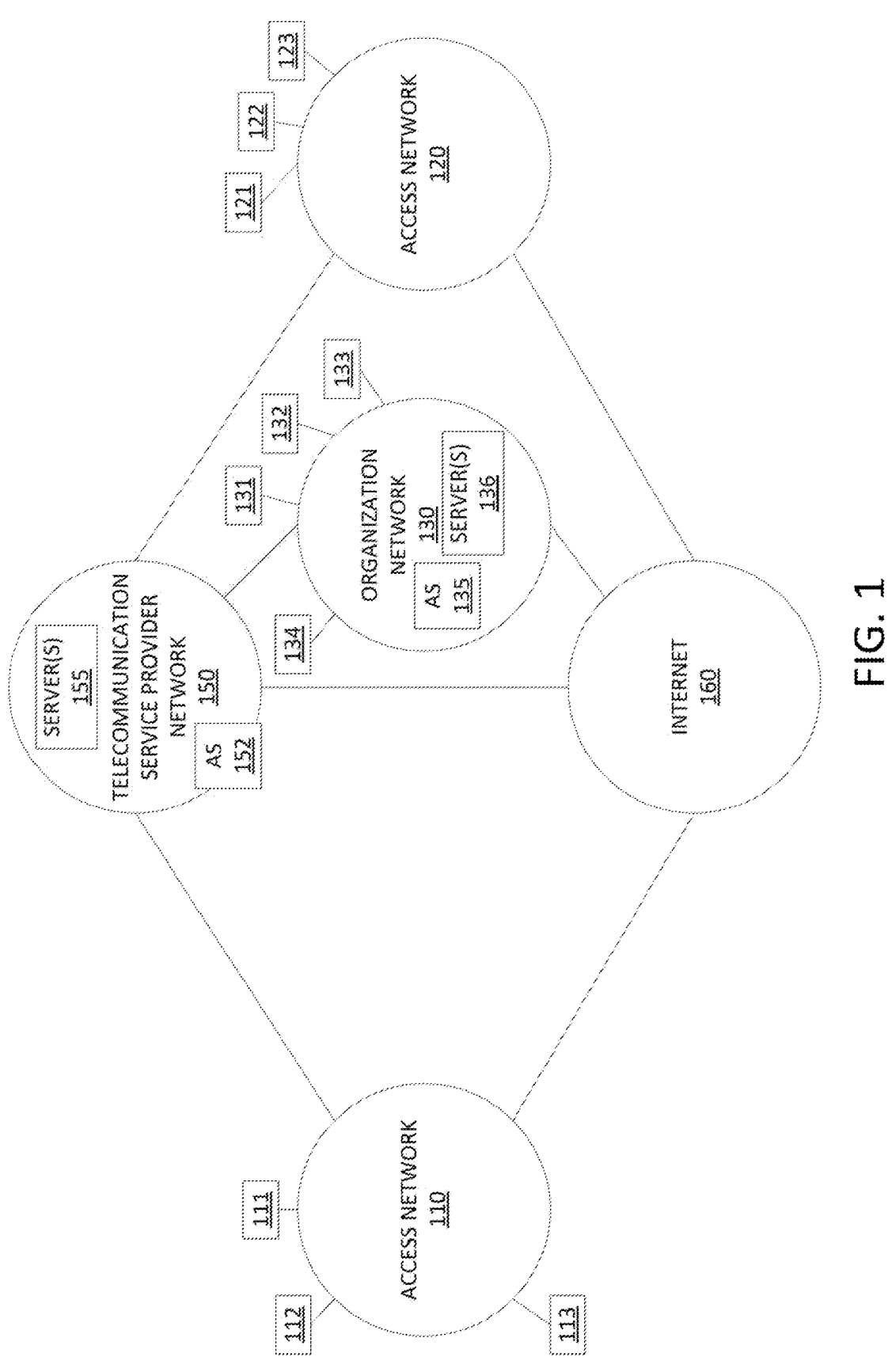
FIG. 1 illustrates one example of a system including a telecommunication service provider network, according to the present disclosure.

The present disclosure broadly discloses devices, non-transitory (i.e., tangible or physical) computer-readable storage media, and methods for retraining a machine learning model when a counter for a likelihood of new data based upon a training data set being less than a first threshold exceeds a second threshold.

At the core of big data applications and services are machine learning models that analyze large volumes of data to deliver various insights, key performance indicators, and other actionable information to the users of the applications and services. Designers may differentiate machine learning models, or machine learning algorithms (MLAs) for different big data applications involving video, speech, text, location information, images, network traffic data, and so forth. As referred to herein, a machine learning model may comprise a MLA that has been "trained" or configured in accordance with input data (e.g., training data) to perform a particular service. Examples of the present disclosure address the "health" of a machine learning model, which may include: (1) "when" to retrain/adapt the machine learning model such that it is relevant/up-to-date to handle ever changing data characteristics, and (2) identifying "factors/causes" that lead to erroneous performance of the machine learning model over time.

In particular, examples of the present disclosure determine when an already trained machine learning model should be updated. Many machine learning models, once deployed, are rarely retrained or are retrained in fixed time intervals such as every month, every six months, every year, etc., or in relation to the accumulation of a certain amount of data, e.g., every 100 GB processed, every 2 TB processed, etc. In contrast, in accordance with the present disclosure, when data properties change at a greater rate, the machine learning model is updated/retrained more frequently so that inference errors are minimized. On the other hand, when the data properties do not change significantly, the updating of the machine learning model is postponed, thereby conserving network and/or computing resources that would be devoted to retraining. Another useful aspect of this approach is that it requires no human intervention in determining when to update a machine learning model. Once it is determined that the machine learning model should be updated, in one example the machine learning model may be automatically retrained according to a predetermined configuration, such as waiting until a next available idle time of a processor or network, waiting until an end of the current day or until the next weekend, and so forth. Examples of the present disclosure are not limited to any particular type of MLA/model, but are broadly applicable to various types of MLAs/models that utilize training data, such as support vector machines (SVMs), e.g., linear or non-linear binary classifiers, multi-class classifiers, deep learning algorithms/models, decision tree algorithms/models, k-nearest neighbor (KNN) clustering algorithms/models, and so forth.

In one example, the operations of the present disclosure may include computing a data distribution of the training data on which the machine learning model (and/or MLA) is first trained. Any parametric or non-parametric distribution can be used, such as Gaussian, Laplacian, Parzen window, etc. Next, the machine learning model may be deployed to process a stream of new data. For instance, the stream of new data may be segmented into blocks, time windows, etc., and applied to the machine learning model to perform a service, e.g., a classification, a prediction, etc. (broadly an "inference"). In addition, the likelihood of this new data from the data distribution of the training data is calculated. If the likelihood of the new data is less than a threshold (e.g., a "first" threshold), then the distribution of the new data is not a good fit to the training data and a counter is incremented. When the counter exceeds a pre-set value (e.g., a "second" threshold), it is determined that the new data is not well represented by the machine learning model. Hence a flag is raised which indicates that it is time to retrain the machine learning model.

In addition, examples of the present disclosure may include a root cause analysis (RCA)—which identifies what features are most responsible for the accuracy of the machine learning model with respect to the service (e.g., classification, clustering, mapping, etc.). RCA includes a quantitative statistical analysis on historical data to determine relevance scores on the impact of the features/variables to the accuracy of the machine learning model. The RCA of the present disclosure does not require any specific domain knowledge/human expertise (however, such information can be used when available) and hence does not have a cold-start problem (e.g., what to do when little is known about a service). The RCA of the present disclosure also provides a systematic probability estimate for root cause features which is not possible with other approaches. For instance, a purpose of RCA is to identify what features/variables are the root causes that most affect the predictive accuracy of the machine learning model. In one example, features are ranked based upon relevance scores, therefore allowing easy identification of the most impactful features.

To illustrate in one example, RCA may relate to a service (e.g., an MLA/machine learning model) that predicts whether a customer of a mobile phone service will drop the service. For instance, the machine learning model may be a binary classifier with two classes: likely to drop and unlikely to drop. In one example, available data may include metadata about the user account, network latency characteristics, metadata regarding chat conversations the user had with a technician (e.g., a number of calls, the duration of the calls, etc.). Broadly, such data may comprise the "features" or "variables." If labels are available, e.g., data indicating specific users who have dropped and/or not dropped the service, then the labels can be used for supervised machine learning. Otherwise, unsupervised machine learning may be utilized. In either case, the process finds an optimization function that determines the relevance of features with respect to the service objective (e.g., predicting service drop/churn), and solves for it based on the available labels (supervised) or in an unsupervised manner. The result is a list of features which are most impactful of the ability of the machine learning model to make accurate inferences, quantified as relevance scores.

In one example, a list may be provided which ranks features based upon a magnitude of change of relevance score. For instance, features which have had the greatest increases in relevance score (and, in one example, the greatest decreases in relevance scores) may be listed first, while features which have had little change may appear last in the list. In addition, in one example, one or more features with the greatest relevance score, and/or which have had a greatest increase in relevance score, may be identified for increased data collection or data sampling with respect to a new training data set (e.g., for further retraining of the machine learning model) and/or with respect to streams of new data to be processed by the retrained machine learning model. Alternatively, or in addition, one or more features with the lowest relevance scores, or with the greatest drops in relevance scores, may be designated for reduced data collection or data sampling with respect to a new training data set and/or with respect to streams of new data to be processed by the retrained machine learning model. These and other aspects of the present disclosure are discussed in greater detail below in connection with the examples of FIGS. 1-3.

To aid in understanding the present disclosure, FIG. 1 illustrates an example system 100 comprising a plurality of different networks in which examples of the present disclosure for retraining a machine learning model when a counter for a likelihood of new data based upon a training data set being less than a first threshold exceeds a second threshold may operate in accordance with the present disclosure. Telecommunication service provider network 150 may comprise a core network with components for telephone services, Internet services, and/or television services (e.g., triple-play services, etc.) that are provided to customers (broadly "subscribers"), and to peer networks. In one example, telecommunication service provider network 150 may combine core network components of a cellular network with components of a triple-play service network. For example, telecommunication service provider network 150 may functionally comprise a fixed mobile convergence (FMC) network, e.g., an IP Multimedia Subsystem (IMS) network. In addition, telecommunication service provider network 150 may functionally comprise a telephony network, e.g., an Internet Protocol/Multi-Protocol Label Switching (IP/MPLS) backbone network utilizing Session Initiation Protocol (SIP) for circuit-switched and Voice over Internet Protocol (VoIP) telephony services. Telecommunication service provider network 150 may also further comprise a broadcast television network, e.g., a traditional cable provider network or an Internet Protocol Television (IPTV) network, as well as an Internet Service Provider (ISP) network. With respect to television service provider functions, telecommunication service provider network 150 may include one or more television servers for the delivery of television content, e.g., a broadcast server, a cable head-end, a video-on-demand (VoD) server, and so forth. For example, telecommunication service provider network 150 may comprise a video super hub office, a video hub office and/or a service office/central office. In one example, telecommunication service provider network 150 may also include an application server (AS) 152 and one or more servers 155, as described in greater detail below. For ease of illustration, various components of telecommunication service provider network 150 are omitted from FIG. 1.

In one example, access networks 110 and 120 may each comprise a Digital Subscriber Line (DSL) network, a broadband cable access network, a Local Area Network (LAN), a cellular or wireless access network, and the like. For example, access networks 110 and 120 may transmit and receive communications between endpoint devices 111-113 and 121-123, and between telecommunication service provider network 150 and endpoint devices 111-113 and 121-123 relating to voice telephone calls, communications with web servers via the Internet 160, and so forth. Access networks 110 and 120 may also transmit and receive communications between endpoint devices 111-113, 121-123 and other networks and devices via Internet 160. For example, one or both of the access networks 110 and 120 may comprise an ISP network, such that endpoint devices 111-113 and/or 121-123 may communicate over the Internet 160, without involvement of the telecommunication service provider network 150. Endpoint devices 111-113 and 121-123 may each comprise a telephone, e.g., for analog or digital telephony, a mobile device, such as a cellular smart phone, a laptop, a tablet computer, etc., a router, a gateway, a desktop computer, a plurality or cluster of such devices, a television (TV), e.g., a "smart" TV, a set-top box (STB), and the like.

In one example, the access networks 110 and 120 may be different types of access networks. In another example, the access networks 110 and 120 may be the same type of access network. In one example, one or more of the access networks 110 and 120 may be operated by the same or a different service provider from a service provider operating the telecommunication service provider network 150. For example, each of access networks 110 and 120 may comprise an Internet service provider (ISP) network, a cable access network, and so forth. In another example, each of access networks 110 and 120 may comprise a cellular access network, implementing such technologies as: global system for mobile communication (GSM), e.g., a base station subsystem (BSS), GSM enhanced data rates for global evolution (EDGE) radio access network (GERAN), or a UMTS terrestrial radio access network (UTRAN) network, among others, where telecommunication service provider network 150 may provide mobile core network 130 functions, e.g., of a public land mobile network (PLMN)-universal mobile telecommunications system (UMTS)/General Packet Radio Service (GPRS) core network, or the like. In still another example, access networks 110 and 120 may each comprise a home network, which may include a home gateway, which receives data associated with different types of media, e.g., television, phone, and Internet, and separates these communications for the appropriate devices. For example, data communications, e.g., Internet Protocol (IP) based communications may be sent to and received from a router in one of access networks 110 or 120, which receives data from and sends data to the endpoint devices 111-113 and 121-123, respectively.

In this regard, it should be noted that in some examples, endpoint devices 111-113 and 121-123 may connect to access networks 110 and 120 via one or more intermediate devices, such as a home gateway and router, e.g., where access networks 110 and 120 comprise cellular access networks, ISPs and the like, while in another example, endpoint devices 111-113 and 121-123 may connect directly to access networks 110 and 120, e.g., where access networks 110 and 120 may comprise local area networks (LANs) and/or home networks, and the like.

In one example, the organization network 130 may comprise a local area network (LAN), or a distributed network connected through permanent virtual circuits (PVCs), virtual private networks (VPNs), and the like for providing data and voice communications. In one example, the organization network 130 links one or more endpoint devices 131-134 with each other and with Internet 160, telecommunication service provider network 150, devices accessible via such other networks, such as endpoint devices 111-113 and 121-123, and so forth. In one example, endpoint devices 131-134 comprise devices of organizational agents, such as customer service agents, or other employees or representatives who are tasked with addressing customer-facing issues on behalf of the organization that provides organization network 130. In one example, endpoint devices 131-134 may each comprise a telephone for analog or digital telephony, a mobile device, a cellular smart phone, a laptop, a tablet computer, a desktop computer, a bank or cluster of such devices, and the like.

In one example, the organization network 130 may be associated with the telecommunication service provider network 150. For example, the organization may comprise the telecommunication service provider, where the organization network 130 comprises devices and components to support customer service representatives, and other employees or agents performing customer-facing functions. For instance, endpoint devices 111-113 and 121-123 may comprise devices of customers, who may also be subscribers in this context. In one example, the customers may call via a telephone or engage in text or multi-media based chat conversations via endpoint devices 111-113 and 121-123 with customer service representatives using endpoint devices 131-134.

In one example, the organization network 130 may also include an application server (AS) 135. In one example, AS 135 may comprise a computing system, such as computing system 300 depicted in FIG. 3, and may be configured to provide one or more functions for retraining a machine learning model when a counter for a likelihood of new data based upon a training data set being less than a first threshold exceeds a second threshold, in accordance with the present disclosure. Similarly, in one example, AS 152 in telecommunication service provider network 150 may comprise a computing system, such as computing system 300 depicted in FIG. 3, and may be configured to provide one or more functions for retraining a machine learning model when a counter for a likelihood of new data based upon a training data set being less than a first threshold exceeds a second threshold, in accordance with the present disclosure. For example, AS 152 or AS 135 may be configured to perform one or more steps, functions, or operations in connection with the example method 200 described below. Thus, as described herein, functions of AS 152 may alternatively be performed by AS 135, and vice versa.

In addition, it should be noted that as used herein, the terms "configure" and "reconfigure" may refer to programming or loading a computing device with computer-readable/computer-executable instructions, code, and/or programs, e.g., in a memory, which when executed by a processor of the computing device, may cause the computing device to perform various functions. Such terms may also encompass providing variables, data values, tables, objects, or other data structures or the like which may cause a computer device executing computer-readable instructions, code, and/or programs to function differently depending upon the values of the variables or other data structures that are provided.

In one example, the system 100 may also include one or more servers 136 and/or one or more servers 155 in organization network 130 and telecommunication service provider network 150, respectively. In one example, the servers 136 and/or 155 may each comprise a computing system, such as computing system 300 depicted in FIG. 3, and may be configured to host one or more centralized system components in accordance with the present disclosure. For example, a first centralized system component may comprise a database of assigned telephone numbers, a second centralized system component may comprise a database of basic customer account information for all or a portion of the customers/subscribers of the telecommunication service provider network 150, a third centralized system component may comprise a cellular network service home location register (HLR), e.g., with current serving base station information of various subscribers, and so forth. Other centralized system components may include a Simple Network Management Protocol (SNMP) trap, or the like, a billing system, a customer relationship management (CRM) system, a trouble ticket system, an inventory system (IS), an ordering system, an enterprise reporting system (ERS), an account object (AO) database system, and so forth. Other centralized system components may include, for example, a layer 3 router, a short message service (SMS) server, a voicemail server, a video-on-demand server, a server for network traffic analysis, and so forth. In addition, in accordance with the present disclosure, centralized system components may also include devices and/or servers for implementing machine learning models in accordance with the present disclosure for various services such as: traffic analysis, traffic shaping, firewall functions, malware detection, intrusion detection, customer churn prediction, content recommendation generation, and so forth. It should be noted that in one example, a centralized system component may be hosted on a single server, while in another example, a centralized system component may be hosted on multiple servers, e.g., in a distributed manner.

In general, the centralized system components may collect, aggregate, and/or store various types of data that may be used as training data for various types of machine learning models and which may be processed via the machine learning models for various services, such as: network signaling and traffic data, call detail records (CDRs) or session records, which may contain a device type identifier (e.g., the manufacturer, model, firmware version and other similar features which distinguish one device type from another), a cell identifier, which identifies the cell that serves the device (e.g., the serving base station), one or more application identifiers identifying the application(s) used in the session, and usage statistics for the session, such as a total number of bytes, total number of packets, and total number of flows during that session, and so on, customers' network service profile data, demographic data, and/or service usage data, mobile device location data, and various other types of data (broadly "network operation records"). Other types of data may include records generated by an interactive voice response (IVR) system of organization network 130 (e.g., one of the servers 136), call summary records entered by call center personnel of organization network 130, and so forth. Still other types of data may include audio, video, and or image data, e.g., for image, voice, or other pattern recognition, for gait analysis, and so on, and may comprise data that is transmitted via one or more networks and/or links of the system 100, and/or which is stored by one of the centralized system components, e.g., a database server, or cluster.

In accordance with the present disclosure, in one example, AS 152 (and/or AS 135) may collect network operations records or other types of data from one or more centralized system components (e.g., servers 155 and/or servers 136). In one example, the data that is collected may relate to customers associated with endpoint devices 111-113 and 121-123, e.g., network traffic data for such customers, service profile data for such customers, and so forth. In one example, the centralized system components may forward data to AS 152 (and/or AS 135) on a periodic basis, when a certain quantity of data has been collected and is ready to transmit, etc. Alternatively, or in addition, AS 152 (and/or AS 135) may query the centralized system component(s), e.g., periodically or on some other basis, in order to retrieve the data. As described in greater detail below, AS 152 (and/or AS 135) may then create a predictive model (a machine learning model) for a given service based upon the data that is collected, and apply a stream of new data that is collected to the machine learning model to generate an inference in accordance with the machine learning model. In one example, the machine learning model may be deployed at AS 152 and/or AS 135. In another example, the machine learning model may be deployed at one or more of the centralized system components from which the data is gathered, or at one or more different centralized system components. In addition, as referred to herein, a stream may comprise real-time data that is traversing a network or that is being generated by one or more devices, sensors, and so forth. A stream may also comprise a stored series of new data, such as a sequence of images, e.g., discrete images or frames in video, a batch of files, and the like.

The machine learning model may be generated from the training data set in a variety of ways. For instance, the purpose of a machine learning algorithm (MLA) may be to generate a machine learning model, such as a SVM-based classifier, e.g., a binary classifier and/or a linear binary classifier, a multi-class classifier, a kernel-based SVM, etc., a distance-based classifier, e.g., a Euclidean distance-based classifier, or the like, or a non-classifier type machine learning model, such as a decision tree, a KNN predictive model, a neural network, and so forth. For illustrative purposes, examples of the present disclosure are described herein primarily in connection with classifier type MLAs/machine learning models. In one example, the training data set may include labeled data which may be used in training the machine learning model to discriminate positive examples from negative examples. In an example where the classifier comprises a SVM, the machine learning algorithm may calculate a hyper-plane in a hyper-dimensional space representing the features space of all possible customer traits. The hyper-plane may define a boundary in the feature space which separates positive examples from negative examples. Once a classifier, or other type of machine learning model/predictive model, is generated for a particular network service and for a particular designated future time period, the classifier may be applied to a stream of new data at one or more of servers 155 and/or servers 136, or at AS 152 and/or AS 135

For instance, a stream of new data may be translated into a vector in the feature space, and the classifier may be used to determine on which "side" of the hyper-plane the vector lies. As such, the classifier may determine whether the stream of new data is a positive or a negative example. In one example, a confidence score may be calculated and provided along with the classification. For instance, a distance between the vector representing the customer and the hyperplane may be calculated. Thereafter, the confidence score may be calculated from the distance. For example, the confidence score may be proportional to the distance. The greater the distance, the higher the confidence score. In one example, the relationship between the distance and the confidence score may be empirically set.

It should also be noted that in other, further, and different examples, variations of one or more of the above described operations may be implemented in accordance with the present disclosure. For example, a decision tree algorithm may be used instead of a SVM-based binary classifier. In another example, a binary KNN algorithm may be utilized. In still another example, a distance-based classifier may be used. For example, the machine learning algorithm may comprise a clustering algorithm over positive examples to generate a vector in a hyper-dimensional space representing the average of the positive examples. In other words, the vector may represent the "average" of the customer traits of positive example customers. Thus, these and other modifications are all contemplated within the scope of the present disclosure. Various additional functions of AS 152 (and/or AS 135) in connection with retraining a machine learning model when a counter for a likelihood of new data based upon a training data set being less than a first threshold exceeds a second threshold are described in greater detail below in connection with the example of FIG. 2. In addition, it should be realized that the system 100 may be implemented in a different form than that illustrated in FIG. 1, or may be expanded by including additional endpoint devices, access networks, network elements, application servers, etc. without altering the scope of the present disclosure.

FIG. 2 illustrates an example flowchart of a method 200 for retraining a machine learning model when a counter for a likelihood of new data based upon a training data set being less than a first threshold exceeds a second threshold. In one example, the steps, operations, or functions of the method 200 may be performed by any one or more of the components of the system 100 depicted in FIG. 1. For instance, in one example, the method 200 is performed by the application server 135 or application server 152, or by application server 135 or application server 152 in conjunction with other components of the system 100. Alternatively, or in addition, one or more steps, operations or functions of the method 200 may be implemented by a computing device having a processor, a memory and input/output devices as illustrated below in FIG. 3, specifically programmed to perform the steps, functions and/or operations of the method. Although any one of the elements in system 100 may be configured to perform various steps, operations or functions of the method 200, the method will now be described in terms of an example where steps or operations of the method are performed by a processor, such as processor 302 in FIG. 3.

The method 200 begins at step 205 and proceeds to step 210. At step 210, the processor trains a machine learning model with a training data set. In one example, the training may comprise feeding all or a portion of the training data set to a machine learning algorithm to generate the machine learning model. For example, the machine learning algorithm may comprise a SVM, e.g., a linear or non-linear binary classifier, a multi-class classifier, a deep learning algorithms, a decision tree algorithm, a KNN clustering algorithm, and so forth. In one example, the training may comprise unsupervised learning. In another example, the training data set may include or comprise labeled data. Thus, the training may comprise supervised machine learning. In one example, a portion of the training data set is used to train the machine learning model. For instance, data associated with various features may be randomly sampled, sampled at regular data intervals, and so forth, such that less that all of the available training data set is used to train the machine learning model.

At step 220, the processor computes a data distribution of the training data set. For instance, the data distribution may be calculated as a parametric or a non-parametric distribution. The data distribution that is calculated may comprise, for example, a Gaussian distribution (e.g., an N-dimensional Gaussian), a Laplacian distribution, or a Parzen window. The data distribution may be calculated using all or at least a portion of the training data set. In one example, the at least a portion of the training data set may be the same as is used to train the machine learning model at step 210. In another example, the at least a portion of the training data set that is used to compute the data distribution at step 220 may be different from a portion of the training data set that is used to train the machine learning model at step 210.

At step 230, the processor processes a stream of new data to determine a likelihood of the new data from the data distribution that is computed at step 220. The likelihood may comprise a Euclidean or non-Euclidean distance between the data distribution of the training data set and a data distribution of the stream of new data, e.g., with respect to a feature space comprising the same dimensions/feature vectors for both the data distribution of the training data set and the data distribution of the stream of new data. In another example, the likelihood may comprise an integral of the difference between the data distribution of the training data set and a data distribution of the stream of new data. In one example, the likelihood may be reported as a value (e.g., a percentage, or a score on a different scale). In one example, step 230 may relate to at least a portion of the stream of new data, e.g., a data block of a given size, data from a given time window, etc. For instance, step 230 may be repeated with respect to multiple blocks, windows, segments, etc. of the stream of new data, and/or may be repeated with respect to multiple different streams of new data.

In one example, the size of the training data set and the size of the stream of new data may be the same. However, in another example, the stream of new data may be larger or smaller (in term of data volume) that the training data set. For instance, the training data set may comprise 100 TB of network traffic data, whereas the stream of new data may comprise 1 TB. Nevertheless, the distribution of the training data set and the stream of new data may be similarly proportioned along the dimensions of the feature space. In one example, the likelihood is a percentage that is scaled to a distance between the data distribution of the training data set and the data distribution of the stream of new data. However, in a different example, the likelihood may be a value that lies on a different scale, e.g., 0 to 200, −50 to +50 (e.g., where −50 is highly unlikely and +50 is highly likely), and so forth.

At step 240, the processor increments a counter when the likelihood of the new data is less than a first threshold. For example, the less the likelihood that is calculated at step 230, the less representative the training data set is of the stream of new data. In one example, the first threshold may be set by a user, e.g., network operations personnel of a telecommunication network, a call center manager, and so forth. In another example, the first threshold may be dynamically adjusted to fulfill an optimization criterion. For example, the machine learning model may be a classifier that is used to classify network traffic data, such as to identify streaming video traffic within streams of encrypted packets. In addition, the machine learning model may be used in a decision function within a software defined network orchestrator to determine whether to instantiate new software defined network (SDN)-based video servers.

In one example, a geographic region may have recently been offered a premium video streaming service for which there is a large anticipated demand for the new service. Thus, in such a case, the network operator may determine that the accuracy of the machine learning model, e.g., a classifier for discriminating streaming video traffic, be very accurate. Thus, the first threshold may be set to a lower value. However, in another region, there may be less importance placed upon the accuracy of the classifier. Alternatively, or in addition, there may be a countervailing consideration of conserving processing power and network resources so as to not retrain the machine learning model too often. Thus, a higher first threshold may be set. It should be noted that once a threshold is set, the processor may automatically determine when the machine learning model is to be retrained, in contrast to a user manually assessing whether and when to retrain, or based upon a regular schedule, such as retraining once a week, once a month, etc. Following step 240, the method 200 may proceed to step 260 or to optional step 250.

At optional step 250, the processor may apply the machine learning model to the stream of new data to generate an inference, such as a classification, a prediction, and so forth. In this regard, it should be noted that once the machine learning model is trained at step 210, the machine learning model may be deployed "live" to perform its designated inference task, e.g., by the processor performing the method 200 or within another device, such as within a network traffic processing server, within a server or other computing device for image processing tasks, within a call center server, and so forth. However, steps 220 and 230 may be performed "offline," which in accordance with the present disclosure may comprise functions that are performed on a separate device, functions that are performed during times that the processor, data storage devices, network, and/or other resources are idle or have loads that are below certain levels, and so forth.

At step 260, the processor retrains the machine learning model when the counter exceeds a second threshold. For example, steps 230 and 240 (and optional step 250) may be part of an ongoing process of calculating a likelihood of new data based upon the data distribution of the training data set. For instance, the stream of new data may be segmented into "windows" or blocks, e.g., regular sized blocks, e.g., 100 GB blocks, blocks of data from a unit time interval (e.g., 1 minute files, 5 minute files, etc.), and so forth. In one example, when the number of blocks of the new data for which the likelihood is less than the first threshold exceeds a second threshold, the processor determines that the training data set, and hence the machine learning model, is no longer representative of the stream of new data. The processor may therefore trigger a retraining of the machine learning model, e.g., using a new training data set that is more representative of the stream of new data.

In one example, the new training data set may be selected from at least a portion of the stream of new data. For instance, the original training data set may comprise 10 TB of historic data, while the new training data set may comprise 10 TB of a most recently available portion of the stream of new data. In another example, the new training data may comprise 10 TB of data sampled from regular intervals within the stream of new data from the time that the machine learning model was last trained (e.g., at step 210). In addition, in one example, the retraining of the machine learning model may be performed "offline," e.g., during times when processor capacity is high, during non-peak hours for network traffic, and so forth. Following step 260, the method 200 may proceed to step 295 or to optional step 270.

At optional step 270, the processor may calculate an optimization function that identifies relevance scores of features of the machine learning model with respect to a service of the machine learning model. In one example, the processor may find a subspace that optimizes for feature relevance using generative objectives, and then back-propagate the results to sort the relevance of the features, e.g., in an unsupervised approach. In another example, the processor may determine a correlation between each feature and objective labels, and then sort the features based upon the order of correlation, e.g., in a supervised approach. Following optional step 270, the method may proceed to optional step 280 or optional step 290.

At optional step 280, the processor may provide an ordered list of the features of the machine learning model ordered by the relevance scores. For instance, the ordered list may be provided to a computing device of operational personnel of a network operator, a call center personnel, and so forth. In one example, the features are ordered based upon the greatest change in relevance scores from a previous calculation of the features' relevance scores. For example, a user may further investigate features which are most impactful of the divergence of the stream of new data from the training data set and may alter various aspects of data collection and/or data sampling. Alternatively, or in addition, a user may determine to change various parameters pertaining to the service, such as an inference task, of the machine learning model, e.g., to make a decision to deploy new network elements, to provide new training to call center agent regarding certain issues which are related to the features that are identified at optional step 270, and so forth. Following optional step 280, the method 200 may proceed to optional step 290 or to step 295.

At optional step 290, the processor may increase a rate of data sampling and/or a rate of data collection with respect to at least one of the features with a relevance score that exceeds a third threshold, or send an instruction to a network element to increase a rate of data collection or data sampling with respect to the at least one of the features with a relevance score that exceeds the third threshold. For example, where it is determined that a feature is more relevant to the accuracy of the service of the machine learning model, the accuracy may be further enhanced by more accurate representation of the data related to the feature, e.g., through increased data collection and/or data sampling, such as more fine grained pixel sampling for image processing, more frequent measurements of an physical property by a sensor, etc. Accordingly, in one example, additional data that is collected or sampled may be used as at least a portion of a new training data set, or as additional training data to retrain the machine learning model. Alternatively, or in addition, step 290 may include decreasing a data sampling rate with respect to at least one of the features with a relevance score that is below a third threshold or sending an instruction to a network element to decrease a rate of data collection with respect to at least one of the features with a relevance score that is below a third threshold. For instance, reducing the rate of data sampling or data collection with regard to features that are less relevant may conserve additional resources, such as processor and/or memory utilization, network bandwidth utilization, and so forth. Following optional step 290, the method 200 may proceed to step 295.

At step 295, the method 200 ends. It should be noted that the method 200 may be expanded to include additional steps or may be modified to include additional operations with respect to the steps outlined above. For example, the method 200 may be repeated through various cycles of test data and streams of new data, and the machine learning model may be retrained at various times via step 260 as determined in accordance with step 240. In another example, for a supervised machine learning approach, if there are comparatively few positive examples or few negative examples, e.g., less than 20 percent, less than 15 percent, etc., a greater or lesser percentage of positive examples or negative examples may be utilized from the training data set as inputs to a machine learning algorithm to effect a positive example weighting or negative example weighting at step 210. In still another example, the machine learning model may utilize a feature space comprising a reduced feature space that may be determined by first performing feature selection at step 210. For example, a feature selection process may include reducing the number relevant features to those which are most useful in a classification task. Alternatively, or in addition, a principal component analysis (PCA) may be applied to the training data set. For instance, PCA may be applied to a hyper-dimensional space of all of the possible features that may be included in the feature set. In another example, PCA may be applied to a hyper-dimensional space based upon a reduced feature set (e.g., a "reduced feature space").

In one example, in a supervised learning approach, a portion of the training data set may be set aside for use as a testing data set to verify the accuracy of the machine learning model at step 210, prior to deployment of the machine learning model at optional step 250. In one example, if the accuracy of the machine learning model is less than a desired accuracy, a feature selection process and/or PCA may be re-run on the training data set, or the portion of the training data set used as inputs to the machine learning algorithm to train the machine learning model may be expanded to include additional data, additional labeled examples, and so forth. Thus, these and other modifications are all contemplated within the scope of the present disclosure.

In addition, although not specifically specified, one or more steps, functions or operations of the method 200 may include a storing, displaying and/or outputting step as required for a particular application. In other words, any data, records, fields, and/or intermediate results discussed in the method 200 can be stored, displayed and/or outputted either on the device executing the method 200, or to another device, as required for a particular application. Furthermore, steps, blocks, functions, or operations in FIG. 2 that recite a determining operation or involve a decision do not necessarily require that both branches of the determining operation be practiced. In other words, one of the branches of the determining operation can be deemed as an optional step. In addition, one or more steps, blocks, functions, or operations of the above described method 200 may comprise optional steps, or can be combined, separated, and/or performed in a different order from that described above, without departing from the examples of the present disclosure.

As such, the present disclosure provides at least one advancement in the technical field of machine learning models for network traffic classification, digital image processing, and so forth. This is in contrast to traditional approaches where a human operator determines when a machine learning model, such as a classifier, has sufficiently declined in accuracy such that a retraining is warranted, or where the machine learning model is retrained according to a regular schedule. For instance, processor resources and/or network bandwidth resources are conserved via the intelligent retraining of a machine learning model as described herein.

The present disclosure also provides a transformation of data, e.g., a training data set is transformed into a machine learning model, and the training data set and a stream of new data are transformed into a likelihood (e.g., a score, a percentage, a value) that is used to determine when to increment a counter, which is further used to trigger the retraining of the machine learning model. In addition, new data is generated insofar as examples of the present disclosure may increase a rate of data collection or data sampling as a result of a determination of a relevance score of one or more features of a feature space of the training data set and the stream of new data.

Finally, examples of the present disclosure improve the functioning of a computing device, e.g., a server. Namely, a server deployed in the telecommunication service provider network is improved via the operations of the present disclosure to train a machine learning model with a training data set, compute a data distribution of the training data set, process a stream of new data to determine a likelihood of the new data from the data distribution that is computed, increment a counter when the likelihood of the new data is less than a first threshold, and retrain the machine learning model when the counter exceeds a second threshold. Furthermore, the telecommunication service provider network is also transformed via the automatic adjustment of data collection or data sampling rates to improve the accuracy of a machine learning model, in accordance with examples of the present disclosure.

Figure 3:
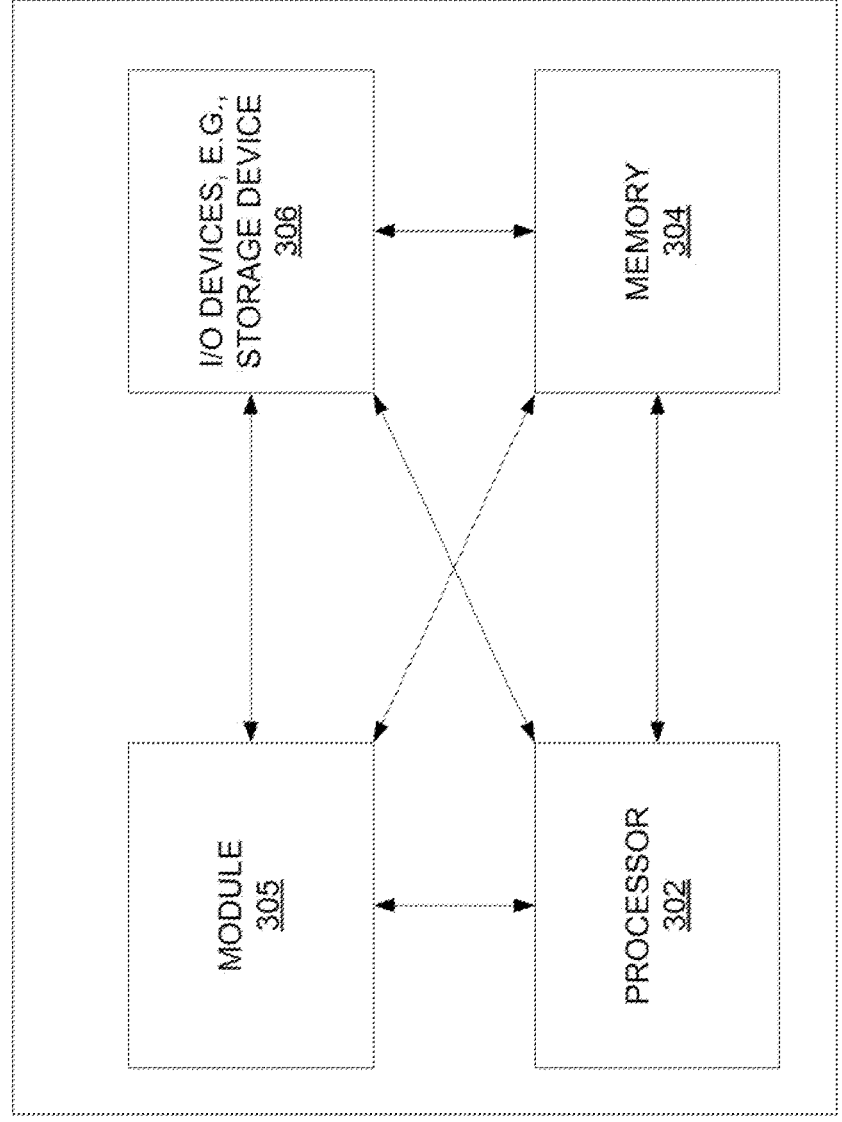
FIG. 3 illustrates a high-level block diagram of a computing device specially programmed to perform the functions described herein.

FIG. 3 depicts a high-level block diagram of a computing device specifically programmed to perform the functions described herein. As depicted in FIG. 3, the system 300 comprises one or more hardware processor elements 302 (e.g., a central processing unit (CPU), a microprocessor, or a multi-core processor), a memory 304 (e.g., random access memory (RAM) and/or read only memory (ROM)), a module 305 for retraining a machine learning model when a counter for a likelihood of new data based upon a training data set being less than a first threshold exceeds a second threshold, and various input/output devices 306 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). Although only one processor element is shown, it should be noted that the computing device may employ a plurality of processor elements. Furthermore, although only one computing device is shown in the figure, if the method 200 as discussed above is implemented in a distributed or parallel manner for a particular illustrative example, i.e., the steps of the method, or the entire method is implemented across multiple or parallel computing devices, then the computing device of this figure is intended to represent each of those multiple computing devices.

Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented. The one or more hardware processors 302 can also be configured or programmed to cause other devices to perform one or more operations as discussed above. In other words, the one or more hardware processors 302 may serve the function of a central controller directing other devices to perform the one or more operations as discussed above.

It should be noted that the present disclosure can be implemented in software and/or in a combination of software and hardware, e.g., using application specific integrated circuits (ASIC), a programmable gate array (PGA) including a Field PGA, or a state machine deployed on a hardware device, a computing device or any other hardware equivalents, e.g., computer readable instructions pertaining to the method discussed above can be used to configure a hardware processor to perform the steps, functions and/or operations of the above disclosed method. In one example, instructions and data for the present module or process 305 for retraining a machine learning algorithm when a counter for a likelihood of new data based upon a training data set being less than a first threshold exceeds a second threshold (e.g., a software program comprising computer-executable instructions) can be loaded into memory 304 and executed by hardware processor element 302 to implement the steps, functions or operations as discussed above in connection with the illustrative method 200. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method can be perceived as a programmed processor or a specialized processor. As such, the present module 305 for retraining a machine learning algorithm when a counter for a likelihood of new data based upon a training data set being less than a first threshold exceeds a second threshold (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. Furthermore, a "tangible" computer-readable storage device or medium comprises a physical device, a hardware device, or a device that is discernible by the touch. More specifically, the computer-readable storage device may comprise any physical devices that provide the ability to store information such as data and/or instructions to be accessed by a processor or a computing device such as a computer or an application server.

While various examples have been described above, it should be understood that they have been presented by way of illustration only, and not a limitation. Thus, the breadth and scope of any aspect of the present disclosure should not be limited by any of the above-described examples, but should be defined only in accordance with the following claims and their equivalents.

What is claimed is:

1. A device comprising:
a processor; and
a computer-readable medium storing instructions which, when executed by the processor, cause the processor to perform operations, the operations comprising:
training a machine learning model with a training data set;
computing a data distribution of the training data set;
processing a stream of new data to determine a probability of the new data from a data distribution of the new data and the data distribution of the training data set that is computed;
incrementing a counter when the probability of the new data is less than a first threshold;
determining, in response to the counter exceeding a second threshold, a future time at which to retrain the machine learning model;
retraining the machine learning model at the future time that is determined;
calculating an optimization function that identifies a plurality of relevance scores of a plurality of features of the machine learning model with respect to a service of the machine learning model; and
transmitting an instruction to at least one network element to decrease at least one of: a data sampling rate or a rate of data collection with respect to at least a first feature of the plurality of features with at least a first relevance score of the plurality of relevance scores that is below a third threshold.

2. The device of claim 1, wherein the data distribution of the training data set is calculated as a parametric distribution or a non-parametric distribution.

3. The device of claim 1, wherein the data distribution of the training data set comprises a Gaussian distribution, a Laplacian distribution, or a Parzen window.

4. The device of claim 1, wherein the machine learning model comprises a classifier.

5. The device of claim 1, wherein the training data set and the stream of new data comprise network traffic data.

6. The device of claim 1, wherein the training data set and the stream of new data comprise network call center data.

7. The device of claim 1, wherein the operations further comprise:
applying the machine learning model to the stream of new data to generate an inference.

8. The device of claim 7, wherein the inference comprises a classification.

9. The device of claim 1, wherein the operations further comprise:
providing an ordered list of the plurality of features of the machine learning model organized by the plurality of relevance scores.

10. The device of claim 1, wherein the operations further comprise:
sending a second instruction to the at least one network element to increase a rate of data collection with respect to at least a second feature of the plurality of features with at least a second relevance score of the plurality of relevance scores that exceeds the third threshold.

11. The device of claim 10, wherein additional data that is collected by the network element in accordance with the second instruction is used to retrain the machine learning model.

12. The device of claim 1, wherein the operations further comprise:
sending a second instruction to the at least one network element to increase a data sampling rate with respect to at least a second feature of the plurality of features with at least a second relevance score of the plurality of relevance scores that exceeds the third threshold.

13. The device of claim 12, wherein additional data that is collected by the network element in accordance with the second instruction is used to retrain the machine learning model.

14. The device of claim 1, wherein the instruction comprises an instruction to the at least one network element to decrease the data sampling rate with respect to the at least the first feature of the plurality of features with the at least the first relevance score of the plurality of relevance scores that is below the third threshold.

15. The device of claim 1, wherein the instruction comprises an instruction to the at least one network element to decrease the rate of data collection with respect to the at least the first feature of the plurality of features with the at least the first relevance score of the plurality of relevance scores that is below the third threshold.

16. The device of claim 1, wherein the probability comprises a distance between the data distribution of the training data set and the data distribution of the stream of new data.

17. The device of claim 1, wherein the probability comprises an integral of a difference between the data distribution of the training data set and the data distribution of the stream of new data.

18. A method comprising:

training, by a processor, a machine learning model with a training data set;

computing, by the processor, a data distribution of the training data set;

processing, by the processor, a stream of new data to determine a probability of the new data from a data distribution of the new data and the data distribution of the training data set that is computed;

incrementing, by the processor, a counter when the probability of the new data is less than a first threshold;

determining, by the processor in response to the counter exceeding a second threshold, a future time at which to retrain the machine learning model;

retraining, by the processor, the machine learning model at the future time that is determined;

calculating, by the processor, an optimization function that identifies a plurality of relevance scores of a plurality of features of the machine learning model with respect to a service of the machine learning model; and transmitting, by the processor to at least one network element, an instruction to decrease at least one of: a data sampling rate or a rate of data collection with respect to at least a first feature of the plurality of features with at least a first relevance score being of the plurality of relevance scores that is below a third threshold.

19. A non-transitory computer-readable storage medium storing instructions which, when executed by a processor, cause the processor to perform operations, the operations comprising:

training a machine learning model with a training data set;

computing a data distribution of the training data set;

processing a stream of new data to determine a probability of the new data from a data distribution of the new data and the data distribution of the training data set that is computed;

incrementing a counter when the probability of the new data is less than a first threshold;

determining, in response to the counter exceeding a second threshold, a future time at which to retrain the machine learning model;

retraining the machine learning model at the future time that is determined;

calculating an optimization function that identifies a plurality of relevance scores of a plurality of features of the machine learning model with respect to a service of the machine learning model; and transmitting an instruction to at least one network element to decrease at least one of: a data sampling rate or a rate of data collection with respect to at least a first feature of the plurality of features with at least a first relevance score of the plurality of relevance scores that is below a third threshold.

20. The non-transitory computer-readable storage medium of claim 19, wherein the data distribution of the training data set is calculated as a parametric distribution or a non-parametric distribution.

* * * * *